United States Patent Office

3,454,241
Patented July 8, 1969

1

3,454,241
SWIVELING LIFT ENGINES FOR
VTOL AIRCRAFT
Fritz Riemerschmid, Starnberg, Germany, assignor to
M.A.N. Turbo G.m.b.H., Munich-Allach, Germany
Filed Aug. 4, 1967, Ser. No. 658,564
Claims priority, application Germany, Aug. 24, 1966,
M 70,698
Int. Cl. B64b 1/24; B64c 15/12
U.S. Cl. 244—55                                1 Claim

ABSTRACT OF THE DISCLOSURE

For vertical flight the aircraft engines on each side of the aircraft can be swung out of the fuselage and directed downwardly for obtaining vertical thrust. During the transition from vertical to horizontal flight, the engines can be turned from a substantially vertically to a more horizontally directed position. The engines are inclined relative to the fuselage so that their resultant thrust passes through the resultant axis of the center of gravity of the aircraft.

---

The invention is concerned with swiveling lift engines for VTOL aircraft.

In this type of aircraft the engines must need a minimum space for the installation in the aircraft and, secondly, to be put into operation in as simple a manner as possible, in order to permit the gas jets to be discharged in the desired directions with a minimum of obstructions during vertical flight and transitions.

Pure lift engines are known which are installed in the airframe or in a pod at the end of the wing in a vertical and fixed position, the gas jets of which are discharged to generate a vertical thrust vector after opening of the flaps located in the fuselage or pod floor. This type of arrangement is of disadvantage in that the lift engines are not directly supplied with air during vertical flight, but rather via separate intake ducts, resulting in the lift engines being subject to an appreciable performance loss.

Furthermore, pure lift engines are known which can be swiveled out of the airframe to rotate about a number of axes, in order to achieve a position required for vertical flight. In this case, the swiveling mechanism is complicated, and the design of the engine services involves expensive and intricate features, since the lines will have to follow the swiveling movement about several axes.

With these known aircraft equipped with lift engine systems of this type, the clearance between the final nozzle of each lift engine and the ground is extremely small, and experience has shown that the gas jets directed vertically downwards will cause substantial ground erosion of the take-off strip during, for instance, the take-off phase, and that the objects loosened and thrown up due to the impingement of the high-energy hot gases on the ground, particularly upon starting an additional afterburning of the engine gases, can result in damaging the aircraft and its engines.

It is true that, for allowing the hot, high-energy gas jets to impinge on the ground without any danger, special take-off strips consisting of a metallic heat-resisting structure have already been tested for use with V/STOL aircraft, but this solution cannot meet the requirements of an aircraft on a military mission, which is supposed to take-off and land on fields not previously prepared, this feature just being the essential adavntage of this type of this type of aircraft.

Thus, the object of this invention is to arrange the lift engines on a V/STOL aircraft in such a manner as to provide a maximum clearance between the engine intake and the take-off strip during vertical take-off, and to ensure that they require a minimum of space within the airframe during pure horizontal flight when they are shut down, and, on the other hand, to ensure that their swiveling and actuating mechanisms involve a minimum of complicated features.

This invention provides a solution to the given problem, basically, by allowing the lift engines to be swiveled out of the airframe, for vertical flight, on both sides of the aircraft by means of pivoted levers arranged on the side of the fuselage, preferably, above the horizontal transverse central plane of the aircraft, so that their final nozzle positions are basically directed vertically downwards. During vertical take-off, the clearance between take-off strip and exit of the final nozzle of each lift engine is thus substantially increased, and the temperature of the vertical jets will be decreased appreciably due to mixing with the ambient air, before they hit the ground. Furthermore, the arrangement of the lift engines, as proposed by this invention, will basically ensure that the objects thrown up by the gas jets hitting the ground are not ingested by the engine intake, thus avoiding complete destruction of the engine. Each lift engine is swiveled out of the airframe about a single axis only by means of the arrangement suggested in this invention, so that the swiveling mechanism can be designed much simplier than that used for lift engine systems requiring the engines to be swiveled about several axes when they are moved out of the airframe.

According to this invention, the lift engines are retracted into the airframe for a shut-down position, for instance, during pure horizontal flight, in such a manner that they are located approximately below the horizontal transverse central plane of the aircraft on both sides within the fuselge, and that their intakes are basically directed downwards, the space remaining between the lift engines preferably being used for storage as for accommodating drop loads.

In this position, the lift engines are accommodated in the airframe in a favorable manner, so that there will be sufficient space above the lift engines for passengers and load. Furthermore, the lift engines will not cause any additional flow resistance during pure horizontal flight.

In a further embodiment of this invention, the pivoting lever arms of the lift engines are designed so that they form part of the aircraft outer skin. This ensures that the pivoting lever arms will not protrude into the fuselage of the aircraft during inward or outward swiveling, thus requiring no additional space within the airframe.

The means by which the objects of this invention are obtained are described more fully with reference to the accompanying drawings, in which.

Figure 1:
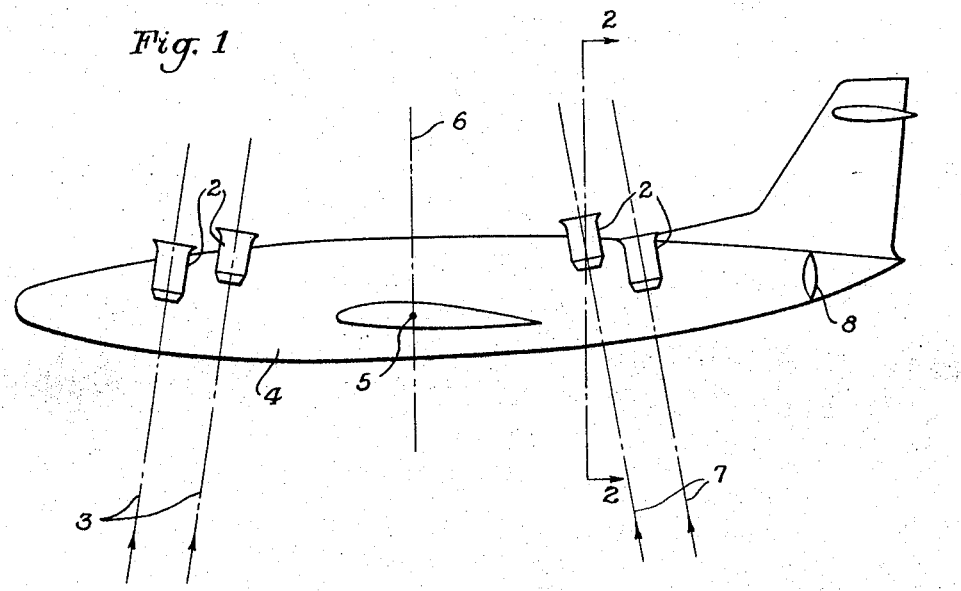
FIGURE 1 is a side elevational view of an aircraft equipped with lift engines in their final positions for vertical flight.

FIG. 1 shows a VTOL aircraft equipped with pure lift engines 2 which have assumed their fully extended final positions for pure vertical flight. The resultant thrust action lines 3 of those lift engines 2 mounted on the side of the aircraft fuselage 4 which is located in front of the center of gravity 5 of the aircraft are inclined under an angle of 20° both at an oblique position rearwards and sidewise toward the inside, FIG. 2, relative to the resultant axis 6 of the center of gravity 5, while the resultant thrust action lines 7 of the relevant lift engines 2, located at the rear of the aircraft center of gravity 5, are inclined under an angle of 20° both at an oblique position toward the front and sidewise toward the inside, FIG.

2, relative to the resultant axis 6 of the center of gravity 5. In this manner, a satisfactory lateral and longitudinal stability of the aircraft is maintained during vertical flight. In this case, the lift engines 2 are arranged on both sides of the aircraft fuselage 4 in such a manner as to allow their resultant thrust vector to pass through the center of gravity 5 of the aircraft.

At the tail of the aircraft the gas discharge opening 8 is shown of one of the propulsion engines designed for pure horizontal flight and installed on both sides of the aircraft tail.

Figure 2:
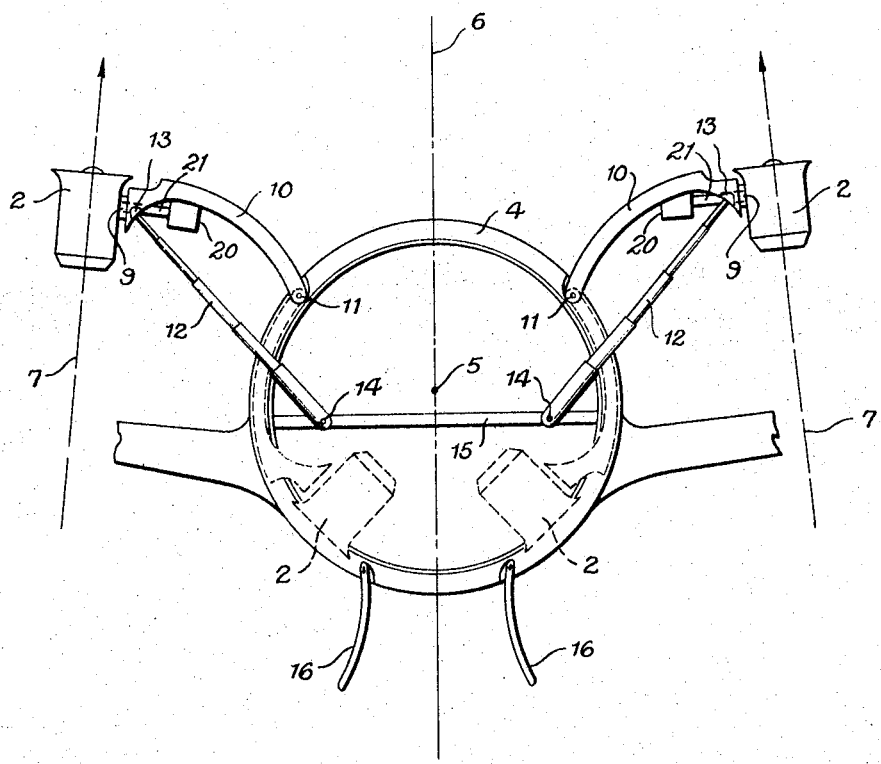
FIGURE 2 is a cross-sectional view taken on the line 2—2 of FIGURE 1.

FIG. 2 shows the lift engines 2 in their fuly extended final positions for pure vertical flight. The other final position, when the engines are fully retracted to stay within the airframe 4, is shown in broken lines. The lift engines 2 are connected with the lever arms 10 by pivoting bearings 9 located at one end of the levers, with the lever arms 10 constituting part of the aircraft outer skin, in this case. At their other ends, the lever arms 10 are pivot-mounted on the airframe at the points 11. The retracting and extending mechanism of the lift engines 2 is actuated by hydraulically-operated, telescopic type cylinders 12, one end of which being connected with the lever arms 10 by a pivot joint 13, while their other ends are connected to a cross-member 15 of the airframe by means of swivel joints 14. Motors 21 are mounted on the lever arms 10 and are connected to lift engines 2 by drive shafts 21 for the purpose of turning or pivoting engines 2 from a downwardly directed position to an oblique position and vice versa. These motors are driven by conventional adjustable means.

When the lift engines 2 are in their fully retracted positions, shown in broken lines. then the flaps 16 formed by components of the aircraft outer skin are also moved to close the intakes of the engines 2, so that the outer fuselage contour is completely closed.

Figure 3:
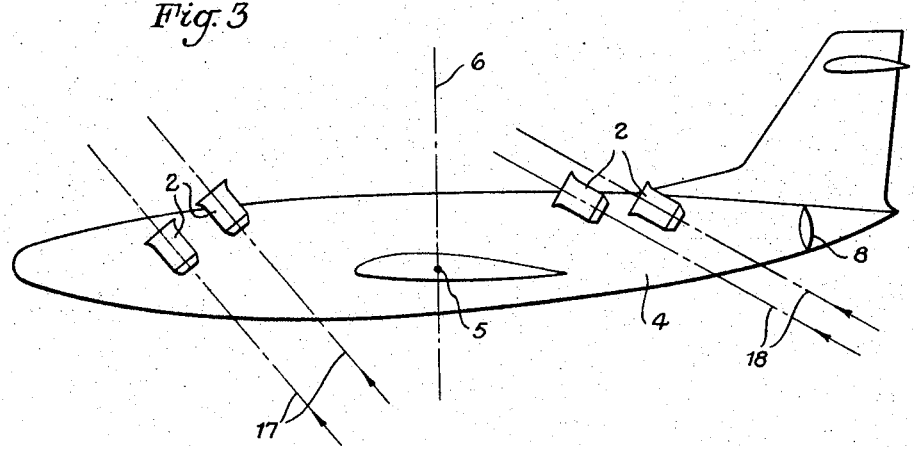
FIGURE 3 is a side view of an aircraft with the lift engines in different final positions between vertical and horizontal flight.

FIG. 3 shows the aircraft to FIG. 1 during a transitional phase from vertical flight to the horizontal flight. In this case, the lift engines 2, which are located in front of the aircraft center of gravity 5 and secured to the lever arms 10 by means of swivel bearings 9, FIG. 9, are directed in such a manner as to allow the resultant thrust action lines 17 of the lift engines 2 to point forward at an oblique position, whereby the thrust action lines 18 of the lift engines 2, located aft of the aircraft center of gravity 5, are also directed forward at a desired angle.

The lift engines 2 located in front of the aircraft center of gravity 5, however, can also be swiveled to such a position, for the transitional phase from horizontal flight to the vertical flight, that their resultant thrust action lines are directed basically rearward at an oblique position, in order to cause a braking effect to take place.

From FIG. 3, it is seen that the lift engines 2, arranged in front of and aft of the aircraft center of gravity 5, are offset relative to each other, in order to prevent their thrust jets from interfering with each other.

Having now described the means by which the objects of this invention are obtained, I claim:

1. A VTOL aircraft compirsing a fuselage having a horizontal central plane, stationary engines solely for horizontal flight, and lift engines (2) solely for vertical flight, level arms (10) pivotally mounted on said fuselage on axes (11) parallel to the longitudinal centerline of said aircraft and above said central plane and supporting said lift engines on their outer ends, telescopic hydraulic cylinders (12) having one end pivotally mounted in said fuselage and the other end joined to a lever arm, respectively, for swinging said lever arms and engines from within said fuselage outwardly of said fuselage and upwardly to position said engines above said axes (11), said engines in this position having resultant thrust lines (7) inclined sideways and inwardly relative to the resultant axis (6) of the center of gravity (5) of the aircraft to stabilize the aircraft about its longitudinal axis, and motor means (20) joined to said lift engines for turning said lift engines on axes (9) so that during vertical flight (FIG. 1) the lift engines have thrust lines (3) in front of the center of gravity (5) and inclined rearwardly while the thrust lines (7) positioned aft of the center of gravity (5) are inclined forwardly to stabilize the aircraft about its lateral axis, and for producing thrust lines (17, 18) which are inclined forward and parallel to each other for STOL take-off or during transition of the aircraft from vertical to horizontal flight.

References Cited

UNITED STATES PATENTS

| | | | |
|---|---|---|---|
| 1,717,485 | 6/1929 | Wirz | 92—53 |
| 3,084,888 | 4/1963 | Hertel | 244—56 |
| 3,289,980 | 12/1966 | Hill | 244—56 |

FOREIGN PATENTS 506,664   5/1954   Belgium.

OTHER REFERENCES

1,080,860, Apr. 28, 1960 #1 German application.
1,175,555, Aug. 6, 1964 #2 German application.

MILTON BUCHLER, *Primary Examiner.*

J. E. PITTENGER, *Assistant Examiner.*

U.S. Cl. X.R.

244—15